I. E. Palmer,

Tackle Block.

No. 3,226. Reissued Dec. 8, 1868.

Witnesses.

Geo. H. Douglas

M. M. Livingston

Inventor:

Isaac E. Palmer

N. PETERS, PHOTO-LITHOGRAPHER, WASHINGTON, D. C.

United States Patent Office.

ISAAC E. PALMER, OF HACKENSACK, NEW JERSEY.

*Letters Patent No.* 25,978, *dated November* 1, 1859; *reissue No.* 1,534, *dated September* 8, 1863; *reissue No.* 1,932, *dated April* 11, 1865; *reissue No.* 3,226, *dated December* 8, 1868.

IMPROVEMENT IN TACKLE-BLOCKS.

The Schedule referred to in these Letters Patent and making part of the same.

*To all whom it may concern:*

Be it known that I, ISAAC E. PALMER, formerly of the city and county of St. Louis, State of Missouri, afterwards of Montville, county of New London, and State of Connecticut, and late of Middletown, county of Middlesex, and State of Connecticut, but now of Hackensack, county of Bergen, and State of New Jersey, have invented a new and useful Improvement in Tackle-Blocks and Pulleys; and I do hereby declare that the following is a full, clear, and exact description of the same, reference being had to the accompanying drawings, forming part of this specification.

This invention consists in so constructing a tackle-block and pulley that the rope or fall, when desired, may be clamped between a portion of the pulley and a portion of or surface connected with the block occupying an invariable distance from the axis of the pulley, and so secured without tying or any other means of fastening, by simply leading the rope or fall, at its one end, to one side, out of or from the running groove or surface on the pulley over which said fall passes when released from gripe.

In referring to the one clamping or griping-surface, as a portion or surface connected with the block occupying an invariable distance from the axis of the pulley, the same is so described, in contradistinction to a dog, movable stop, or other like fastening-device, which, to effect gripe and release of the fall, changes its distance or position relatively to the axis of the pulley.

In carrying out my invention, the surfaces of the pulley, and of the interior of the cavity provided in the block for its reception, may be made of various forms, but the improvement will be sufficiently explained by a description of these forms, represented in the drawings, which I have found successful in practice, and which I consider very well adapted to effect the desired result.

Figure 1, in the drawing, is a front view of the block and pulley.

Similar letters of reference indicate corresponding parts in the several figures.

To enable others skilled in the art to make and use my invention, I will proceed to describe its construction and operation with reference to the drawings.

A is the block, made of any suitable external form, and having provided in it a recess or cavity, *a a′ b b′*, for the reception of the pulley or sheave B.

This pulley is made with a surrounding groove, *c*, like that in an ordinary pulley or sheave, for reception of the rope C *f*, and, at one side of this groove, it has a concentric cylindrical projection, *d*, the circumference of which is about equal to that of the bottom of the groove *c*, and one or more portions of the flange or lip between the groove *c* and cylindrical portion *d* is cut away or omitted, as shown at *e e′*, in figs. 1, 3, 4, and 5, to allow a portion of the rope to be slipped out of the groove *c*, when required, as will be presently explained.

The pulley is secured in the block by a concentric pin, *g*, upon which it works in the usual manner.

The portion *a a′* of the recess *a a′ b b′*, receiving the grooved portion of the pulley, is large enough in all directions for that part of the pulley and the rope to work freely within it, but the portion *b b′* of the recess which receives the cylindrical portion *d* of the pulley, is made very little larger than sufficient for the said portion of the pulley, and not large enough to permit the rope to work between it and the cylindrical portion of the pulley, thus establishing an eccentric character or relationship between the pulley, outside of its groove *c*, and surface connected with the block, such outside portion of the pulley on its periphery moves contiguous to.

Figure 1:
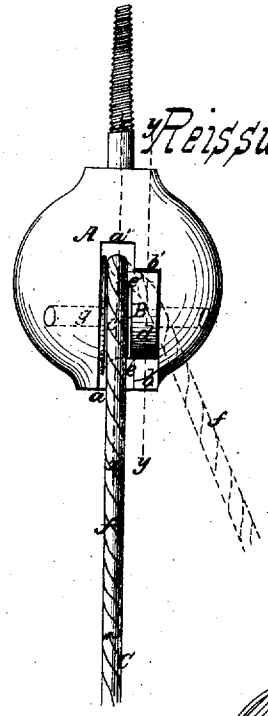
Figure 2:
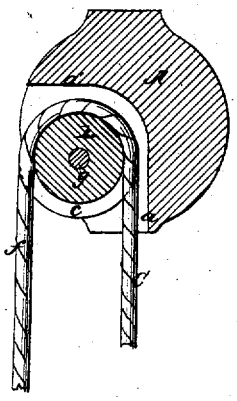
Figure 2 is a vertical section of the same, at right angles to fig. 1, in the plane indicated by the line *x x*, in fig. 1.
Figure 3:
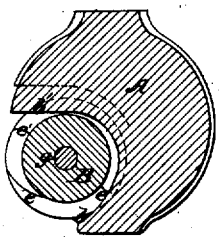
Figure 3 is a vertical section, at right angles to fig. 1.
Figure 4:
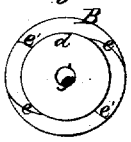
Figure 4 is a right side view of the pulley.
Figure 5:
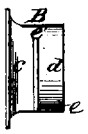
Figure 5 is a front view of the same.

The operation is as follows:

When the fall *f*, and other portions of the rope C, work in a plane or planes parallel with the planes of revolution of the sheave, the pulley revolves freely in the block in either direction, but if the fall *f* be drawn off obliquely, or moved in a direction lateral to such planes, as indicated in red outline in fig. 1, and so caused to slip through one of the openings, *e e′*, in the flange or lip, which is next the cylindrical portion *d*, the instant it is let go it will be drawn, by the weight or strain on the tackle, between the end, *e′*, of one of the said openings, and the part *b′* of the recess *a a′ b b′*, and so jammed or griped hard enough to secure it without tying, or the use of any other means of fastening.

When power is again applied to the fall *f*, it at once liberates itself, by the turning of the pulley.

I do not confine myself to the precise form, herein described and represented, of the pulley, or of the cavity provided in the block for its reception; but

What I claim as my invention, and desire to secure by Letters Patent, is—

The construction of a tackle-block and pulley, whereby the rope or fall, when desired, may be clamped between a portion of the pulley and a portion of or surface connected with the block, substantially as herein described, by simply leading it in a direction oblique or lateral to the plane of revolution of the pulley, without tying, or the use of dogs or movable stops, or any other means of fastening.

ISAAC E. PALMER.

Witnesses:

A. LE CLERC,

A. KINNIER.